Feb. 22, 1949. R. L. SNYDER, JR 2,462,292
LIGHT INTERFERENCE DISTANCE MEASURING DEVICE
HAVING PHOTOELECTRIC MEANS
Filed Aug. 13, 1943 3 Sheets-Sheet 1
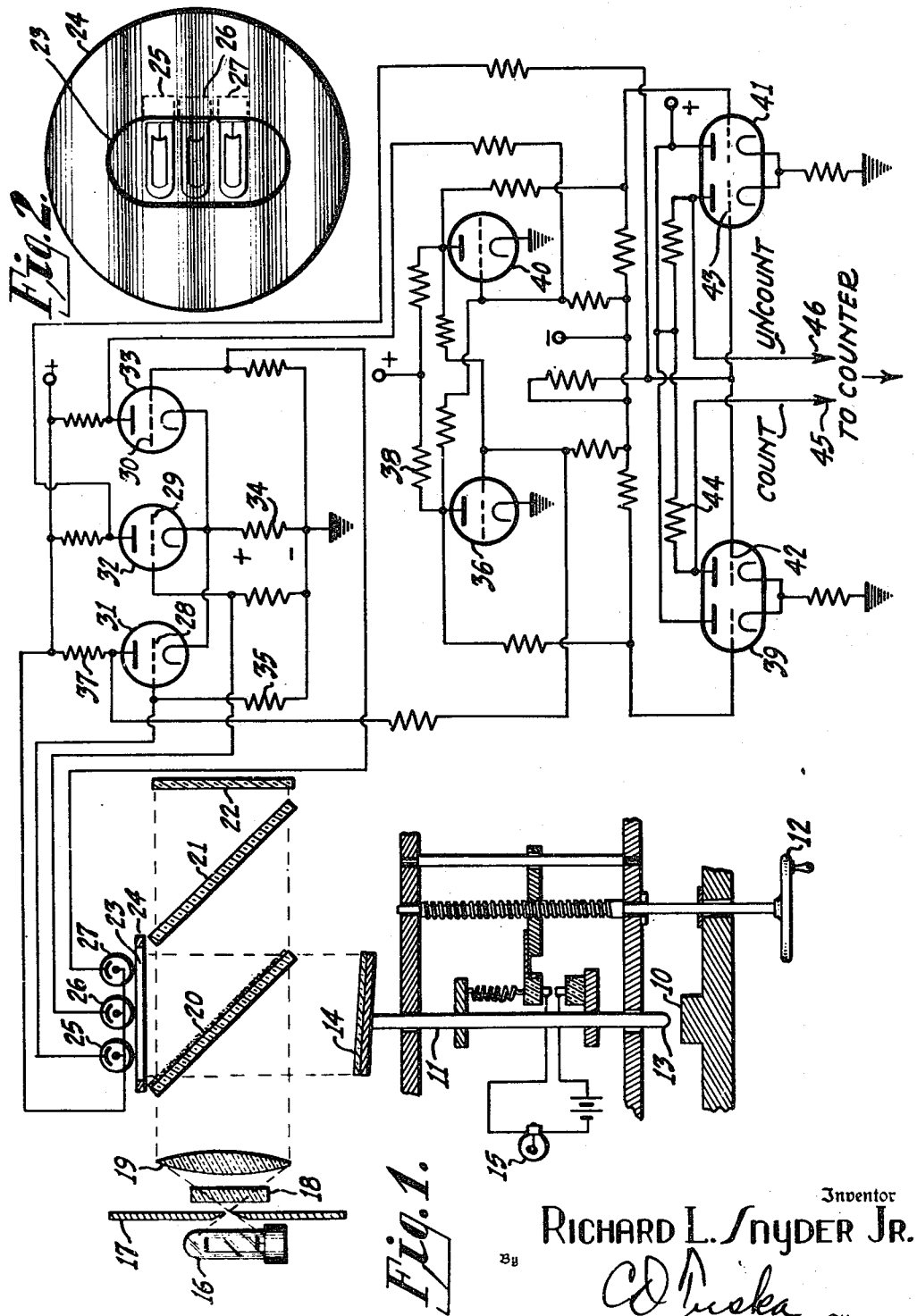
Inventor
RICHARD L. SNYDER JR.
By
Attorney

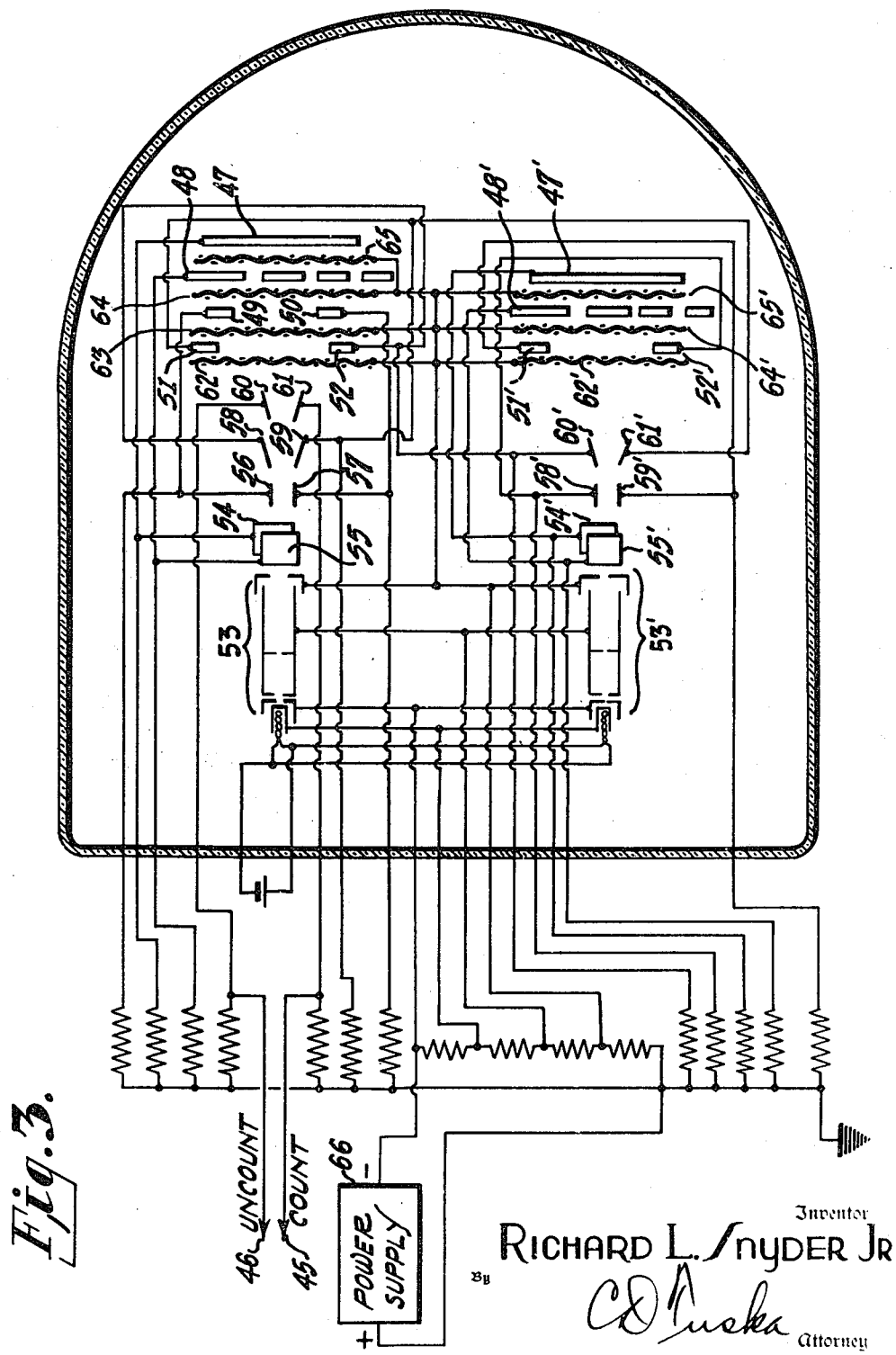

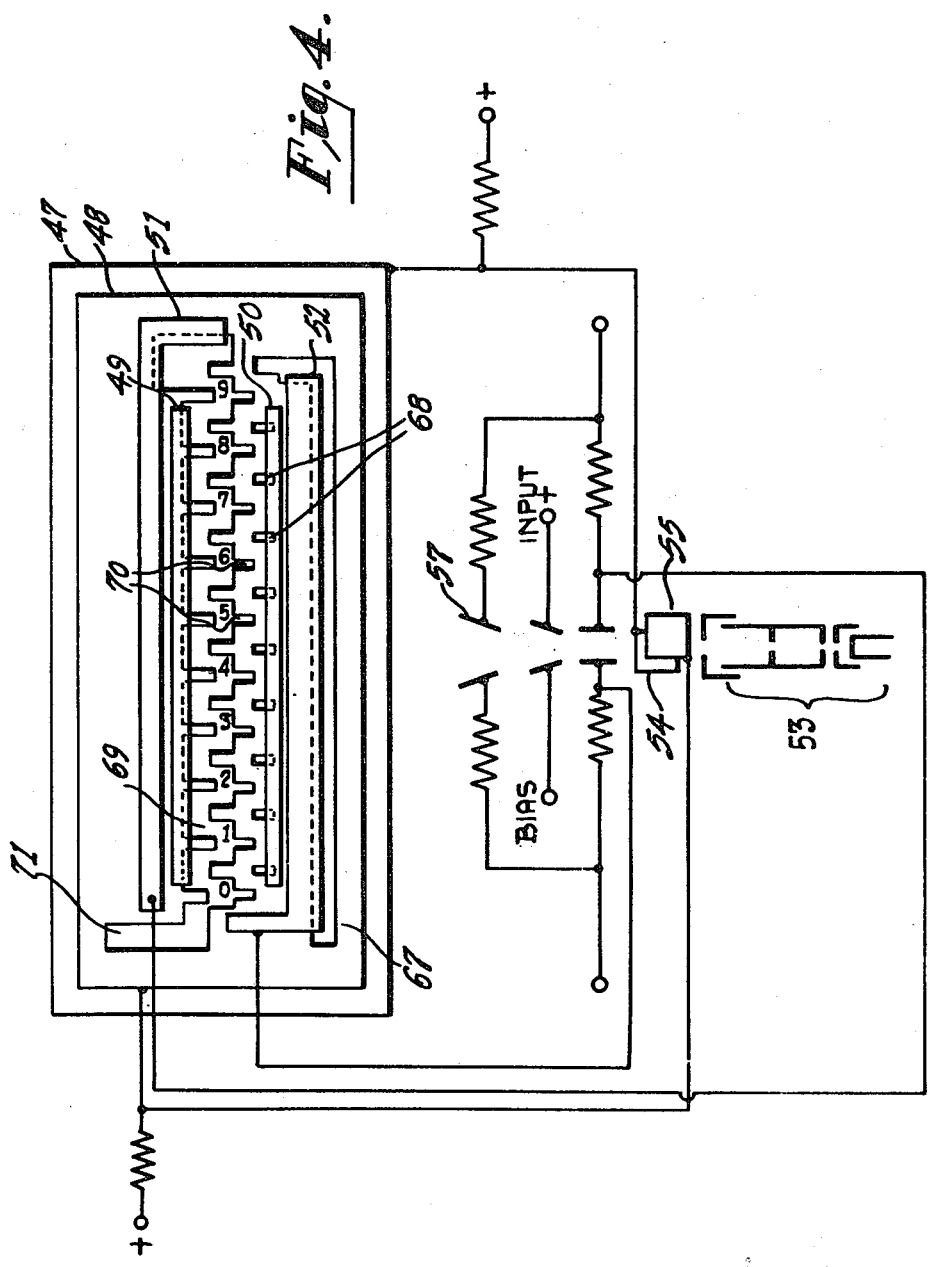

Patented Feb. 22, 1949

2,462,292

UNITED STATES PATENT OFFICE 2,462,292

LIGHT INTERFERENCE DISTANCE MEASURING DEVICE HAVING PHOTOELECTRIC MEANS

Richard L. Snyder, Jr., Princeton, N. J., assignor to Radio Corporation of America, a corporation of Delaware Application August 13, 1943, Serial No. 498,512

3 Claims. (Cl. 88—14)

This invention relates to measuring devices adapted to measure distance in units which are equal to the wavelength of light of a certain selected color. It is well known that the wavelength of monochromatic light is the most accurate standard of length available and that comparison of other lengths with this standard can be made by interference methods involving the use of an interferometer. The wavelength of light is a particularly convenient standard because it is very short and can be easily reproduced. One of the best standards for this purpose is the red cadmium line.

Various devices for practicing this method of measurement have been proposed. Such devices, however, have not been altogether satisfactory because of the difficulty involved in accurately counting the enormous number of interference fringes when making measurements of a few inches. For this reason, such devices have been restricted in use to the small number of cases justifying the expenditure of the time and patience required to count the large number of fringes or lines.

The present invention has for its principal object the provision of an improved distance measuring device which rapidly measures distances of the order of several inches in terms of the wavelength of light. Other objects are to provide a measuring device which is so simple in construction and rapid in operation as to be adapted to be used for practical machine shop measurements; and to provide an instrument or tool which can be used to measure distances up to ten inches or more to within one one hundred thousandth of an inch at a speed as great as one inch per second.

In carrying the invention into effect, any suitable type of interferometer is so modified as to make the fringes appear as parallel bands which move perpendicular to their length in one direction when the measured distance is increased and in the opposite direction when this distance is decreased. Interposed in the path of these parallel bands are a number of photoelectric tubes or light responsive elements spaced from one another transversely of the bands. These light responsive elements are so connected to a corresponding number of amplifiers that, at any instant of time, current from only one light responsive element is transmitted to the corresponding amplifier. Interconnected with the amplifiers is a trigger circuit which operates to control an electronic calculating device in such a way that it registers positively when the bands are moved in one direction and negatively when they are moved in the opposite direction. Under these conditions, the final reading of the counter is obviously the number of bands corresponding to the measured distance.

The invention will be better understood from the following description considered in connection with the accompanying drawings and its scope is pointed out in the appended claims.

Referring to the various figures of the drawings,

Fig. 1 schematically illustrates an interferometer of the Michelson type and the electrical connections of the photoelectric tubes, the amplifiers, and the trigger circuit through which electrical impulses representing the bands are delivered to the electronic counter.

Fig. 2 is an explanatory drawing indicating the relation between the photoelectric tubes and the fringes.

Fig. 3 is for the most part a wiring diagram showing the connections of the electronic counter, and Fig. 4 shows certain structural features of the counter.

While a Michelson type of interferometer is shown at the left of Fig. 1, it is apparent that it may be replaced by other suitable types of interferometers.

The interferometer of Fig. 1 includes an anvil 10 and a plunger 11 which is moved up or down in response to rotation of a handwheel 12. The distance to be measured is that between the anvil 10 and the lower end 13 of the plunger. At the upper end of the plunger is mounted a mirror 14 which is slightly tilted to make the fringes appear as parallel bands rather than of circular shape. A lamp 15 is provided for indicating when the lower end of the plunger touches the anvil and the distance measurement is zero.

Light of a suitable wavelength from a source 16 is transmitted through a light slit in a mask 17 and the filter 18 and the lens 19 to a semitransparent mirror 20. From this mirror light is transmitted through a correcting plate 21 to a mirror 22. Part of the light is reflected to the slightly tilted mirror 14. The fringes produced by interference of the light waves reflected from the mirrors 14 and 22 appear at the slit 23 of a mask 24 behind which are mounted three light responsive devices 25, 26, and 27 as shown in Figs. 1 and 2. In order to minimize the tendency of the distance between the moving fringes to change as the difference in length of the arms of the interferometer changes, the point of equal arm length is preferably set in the middle of the plunger traverse.

The photo tubes 25, 26, and 27 are connected to the control grids 28, 29 and 30 of three amplifiers 31, 32 and 33 which have their cathodes so connected together through a common bias resistor 34 that electrical impulses from only one of the photo tubes can be transmitted at a time. Only the impulse through the center photo tube 26 and amplifier 32 operates the counter. The impulses from the end tubes act on a trigger circuit to determine whether the count is positive or negative, i. e. whether it is to be added or subtracted to give the final measurement. This trigger circuit functions to turn on the proper amplifier depending on whether the photo tube 25 or the photo tube 27 delivers an impulse before an impulse is delivered through the center amplifier 32. How these results are achieved will be readily understood upon consideration of what happens in the various circuits of the system.

Thus assuming that the fringes are moving downwardly as viewed in Fig. 2, the first impulse is delivered by the photo tube 25. As a result of this impulse, the current of tube 25 is increased, more current flows through the grid resistor 35, the grid 28 becomes more positive, the amplifier 31 transmits more current, the grid potential of the trigger circuit tube 36 becomes more negative due to the voltage drop of the amplifier plate resistor 37, the tube 36 transmits less current and the voltage drop of its plate resistor 38 decreases thereby causing a more positive potential to be applied to the left-hand grid of the tube 39 and the single grid of the tube 40. This has two effects. The tube 39 is put into condition to transmit a positive impulse and the current of the tube 40 is increased thereby making the right-half hand rib of the tube 41 more negative so that this tube is not in condition to transmit current.

Under these circumstances, a fringe passing the photo tube 26 makes the control grid of the amplifier 32 more negative thereby decreasing the current of this amplifier and reducing the voltage drop of its plate resistor, so that the directly connected grids 42 and 43 of the tubes 39 and 41 become more positive and a positive counting impulse is passed through the tube 39 thus increasing the voltage drop of its plate resistor 44 and causing a counting pulse to be applied to the counter in one direction through the lead 45.

This process of passing an impulse through the lead 45 to the counter in response to each fringe passing the photo tube 26 continues so long as the fringes move in the same direction.

When the fringes move in the opposite direction, the photo tube 27 receives the first impulse and the trigger circuit is set as previously described so that the successive impulses produced by the moving fringes are passed through the tube 41, instead of the tube 39, thus causing counting pulses to be applied to the counter in the opposite direction through the lead 46. The trigger circuit thus functions to reverse the polarity of the counting pulses when the direction of fringe movement is reversed. As previously indicated, the counter indicates at any instant the algebraic sum of the positive and negative pulses which are applied to it through the leads 45 and 46. The amplifiers and trigger circuit thus function as a selector means to distinguish between the positive and negative pulses.

In my copending application Ser. No. 498,511, filed August 13, 1943, now Patent No. 2,404,106, issued July 16, 1946, are disclosed several modifications of an electronic counter suitable for counting the positive and negative pulses. One of these modifications is here disclosed for the purpose of facilitating an understanding of the complete operation of the distance measuring device.

As will be observed from Figs. 3 and 4, this electronic counter is in the form of an evacuated receptacle within which are mounted an electron gun for forming a beam of electrons, deflecting electrodes for controlling the position of the beam and a composite target which, together with the deflecting electrodes, functions as an escapement, to maintain the beam at a position which at all times indicates the number of impulses that have been applied to the input terminals 45 and 46 of the device.

This electronic counter includes a composite target constructed of a solid conductive back plate 47, a plate 48 perforated as indicated in Fig. 4, a pair of beam overswing correction strips 49 and 50 and a pair of L-shaped beam return targets 51 and 52. All these various parts of the target are electrically insulated from one another and are generally positioned with respect to one another as indicated in Fig. 3. This figure shows two counting units, their corresponding parts being indicated respectively by the same primed and unprimed reference numerals.

Associated with this composite target are a well known type of electron gun 53 which functions to produce a beam of electrons directed at the target, a pair of electrodes 54 and 55 for deflecting the electron beam in a direction lengthwise of the target and three pairs of electrodes 56—57, 58—59 and 60—61 for controlling the position of the beam transversely of the target. It will be noted that the beam overswing correction strips 49 and 50 and the corresponding deflecting electrodes 56 and 57 have been omitted in the lower of the two counters as viewed in Fig. 3. This in permissible for the reason that a standard voltage is applied between the two counting units and no beam overswing correction is required.

In front of each element of the target is provided a grid or shield for the purpose of suppressing secondary electron emission from these elements. These screens or shields are not shown in Fig. 4 but are indicated in Fig. 3 by the reference numerals 62, 63, 64 and 65.

Power for operation of the counter is supplied from a suitable source 66 through a plurality of resistors which are adapted to maintain the proper voltages at various points in the counter as explained in greater detail in the aforesaid copending application.

With the target constructed as shown, each of the two counting units is adapted to accumulate a count of ten. Since each count of ten on the upper unit is delivered to the lower unit as a count of one, the counter as illustrated is capable of counting up to one hundred. By the provision of additional counting units, it is obviously possible to count up to any desired number. Likewise by adapting each counter to count up to a hundred, instead of to ten, the number of fringes counted may be increased to any desired value.

From what has been said it is obvious that this count of ten may be the sum of ten positive impulses, the sum of ten negative impulses or the sum of an indefinite number of positive and negative impulses. How these results are achieved will become apparent upon further consideration of the details of the target and the effect of the various voltages applied to the counter.

Referring to Fig. 4, it will be noted that the perforated member 48 is provided (1) with an elongated perforation 67 the upper edge of which underlies the L-shaped beam return and count transfer bar 52, (2) with a series of similar perforations 68 which partially underlie the beam overswing correcting strip 50 and (3) with a serrated perforation 69 which underlies the lower edge of the beam overswing correction strip 49, has pairs of teeth 0, 1, 2, 3, 4, 5, 6, 7, 8, and 9 extending inwardly from its opposite edges and is slotted between the teeth at its lower edge as indicated by the reference numeral 70. For convenience in understanding, the teeth extending upwardly in Fig. 4 are referred to as counting teeth and those extending downwardly are referred to as transfer teeth.

Consideration of the operation of the counter of Figs. 3 and 4 should be based on an understanding that any part of the target is made more negative when it is struck by the electron beam. Thus when the beam strikes the perforated member 48 both this member and the deflecting electrode 55 which is connected to it become more negative with respect to the deflecting electrode 54 and the beam is deflected to the left lengthwise of the target. When the beam strikes the solid plate 47, both this plate and the deflecting electrode 54 which is connected to it become more negative with respect to the electrode 55 and the beam is deflected to the right lengthwise of the target.

From this it follows that the beam will find a state of equilibrium or come to rest when it is at the edge of one of the teeth and is divided between the members 47 and 48.

A bias potential is applied between the input leads 45 and 46 for maintaining the beam in a position to register with the counting teeth at the lower edge of the aperture 69 when no impulse is applied to the input terminals. Under these conditions, the beam is at rest at the edge of the tooth above the numeral 2, for example.

If a positive impulse is applied through the lead 45 to the deflecting electrode 61, the beam is moved off this counting tooth into alignment with the row of transfer teeth where it strikes the member 47 and is moved to the right till it comes to rest at the edge of the transfer tooth immediately to the left of the numeral 3. When the applied impulse subsides, the beam moves off the transfer tooth, strikes the member 47 and is deflected to the right coming to rest at the edge of the counting tooth immediately to the right of the numeral 3.

In this manner, the beam is moved from one counting tooth to another by escapement action by a series of impulses which number ten when the beam returns to its original 0 position.

If the polarity of the applied impulse is reversed, the beam is driven in the opposite direction lengthwise of the target until it comes to rest at one of the apertures 68 where it is stabilized until the impulse subsides when the beam returns to the counting tooth immediately to the left of the one at which it was previously stabilized.

In this manner, the beam is moved step by step in one direction lengthwise of the target when the count is positive, is likewise moved in the opposite direction when the count is negative and is moved back and forth lengthwise of the target when the counts are of mixed polarity. In any of these cases, when a resultant count of ten positive or ten negative impulses is reached, this count is added to or subtracted from the count of the next successive unit which is similar to that just described.

This transfer of the count from the upper unit to the lower unit of Fig. 3 is effected through the L-shaped beam return or transfer bars 51 and 52. When the beam leaves the tooth above the numeral 9, it strikes the member 47 and moves lengthwise of the target to the L-shaped beam return bar 51 causing this bar and the deflecting electrode 59 which is connected to it to become more negative and driving the beam upwardly until it balances on the boundary between the members 48 and 51. The part of the beam striking the member 48 makes this member and the electrode 55 more negative thus driving the beam to the left until it leaves the member 51 and comes to the boundary between 47 and 48 at the opening 71. When the pulse subsides, the beam then moves along this boundary and slips off the last transfer tooth at the left coming to rest at the first left hand counting tooth.

At the same time an impulse is applied from the transfer bar 51 to the input electrode 61 of the lower counting unit which operates as previously described to register a count of one.

If the polarity of the applied impulses is reversed, the beam moves between the counting teeth and the transfer apertures 68 step by step in the opposite direction and finally reaches the tooth immediately to the right of the reference numeral 0. From that point it passes to the beam return bar 52 causing this bar and the deflecting electrode 58 to become more negative and moving the beam to the right along the edge of the bar 52 until it comes to a state of rest at the counting tooth to the right of the numeral 9. At the same time, an impulse is transferred from the bar 52 to the input electrode 60' of the lower counter unit. As indicated above, such additional units as are necessary to count the fringes in any particular case are provided.

If the beam deflecting voltage varies or becomes greater than necessary, the beam is moved transversely of the target to the overswing correction bar 49 or 50 causing the deflecting electrode 56 or 57 to become more negative thereby preventing the excessive deflection which would otherwise occur.

With this arrangement the three photo tubes 25, 26 and 27 (Fig. 1) pick up the light as a fringe moves along and the resulting impulses are applied to the counter as previously described. The distance to be measured is that between the anvil and the lower end 13 of the plunger 11. Starting with a zero count when the plunger is just touching the anvil, a positive count is registered as the plunger is moved upward. The article to be measured is then placed on the anvil and the plunger is moved downward into contact with it. During this downward movement a negative count is registered so that the resultant count measures in wavelengths of light the distance between the two surfaces of the article. This measurement is readily convertible into inches or other units of measure.

I claim as my invention:

1. The combination of means for producing bands of light, means for moving said bands in different directions, means for producing electrical pulses in response to movement of said bands, and means including a plurality of amplifiers controlled by said pulses and provided with a common cathode resistor for producing pulses of one polarity when said bands are moved in one direction and for producing pulses of a different polarity when said bands are moved in another direction.

2. The combination of means for producing bands of light, means for moving said bands in different directions, means for producing electrical pulses in response to movement of said bands, means including a plurality of amplifiers controlled by said pulses and provided with a common cathode resistor for producing pulses of one polarity when said bands are moved in one direction and for producing pulses of a different polarity when said bands are moved in another direction, and means providing a continuous numerical indication of the difference between the number of pulses of one polarity and the number of pulses of another polarity.

3. The combination of means for producing bands of light, means for moving said bands in different directions, means for producing electrical pulses in response to movement of said bands, and means including a trigger circuit for making said pulses of one polarity when said bands are moved in one direction and for making said pulses of another polarity when said bands are moved in another direction.

RICHARD L. SNYDER, Jr.

REFERENCES CITED

The following references are of record in the file of this patent:

UNITED STATES PATENTS

| Number | Name | Date |
|---|---|---|
| 1,455,795 | Logan | May 22, 1923 |
| 1,951,523 | Nicolson | Mar. 20, 1934 |

FOREIGN PATENTS

| Number | Country | Date |
|---|---|---|
| 687,748 | France | May 5, 1930 |
| 499,545 | Germany | June 10, 1930 |